(12) United States Patent
Vedula et al.

(10) Patent No.: US 9,049,039 B2
(45) Date of Patent: Jun. 2, 2015

(54) SYSTEM AND METHOD FOR MANAGING A CONTROL DEVICE IN A UNIVERSAL PLUG AND PLAY HOME NETWORK

(75) Inventors: Kiran Bharadwaj Vedula, Bangalore (IN); Jong-Hyo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 693 days.

(21) Appl. No.: 13/234,648

(22) Filed: Sep. 16, 2011

(65) Prior Publication Data

US 2012/0071993 A1 Mar. 22, 2012

(30) Foreign Application Priority Data

Sep. 16, 2010 (IN) .......................... 2718/CHE/2010

(51) Int. Cl.
*G06F 19/00* (2011.01)
*H04L 12/28* (2006.01)

(52) U.S. Cl.
CPC .................................. *H04L 12/281* (2013.01)

(58) Field of Classification Search
CPC ...... H04L 12/281; G06F 17/11; G06H 13/12; G06H 13/00
USPC ........ 700/90, 221; 709/231, 224; 710/302, 62
See application file for complete search history.

(56) References Cited

U.S. PATENT DOCUMENTS

| | | | | |
|---|---|---|---|---|
| 7,539,152 B2 * | 5/2009 | Morioka | ...................... | 370/255 |
| 7,693,934 B2 | 4/2010 | Jung et al. | | |
| 7,725,566 B2 * | 5/2010 | Stirbu | ............................ | 709/220 |
| 7,865,622 B2 * | 1/2011 | Hutter et al. | ................... | 709/249 |
| 7,869,433 B2 * | 1/2011 | Park et al. | ...................... | 370/390 |
| 7,933,973 B2 * | 4/2011 | Kim et al. | ....................... | 709/219 |
| 8,078,732 B2 * | 12/2011 | Jo | .................. | 709/227 |
| 8,135,014 B2 | 3/2012 | Choi | | |
| 8,166,137 B2 * | 4/2012 | Morozumi et al. | ........... | 709/220 |
| 8,346,954 B2 * | 1/2013 | Roe et al. | ....................... | 709/230 |
| 2002/0078161 A1 * | 6/2002 | Cheng | ........................... | 709/208 |
| 2002/0083143 A1 | 6/2002 | Cheng | | |
| 2004/0083303 A1 * | 4/2004 | Hwang | ......................... | 709/232 |
| 2005/0099982 A1 | 5/2005 | Sohn et al. | | |
| 2005/0132366 A1 * | 6/2005 | Weast | .............................. | 718/1 |
| 2005/0159823 A1 * | 7/2005 | Hayes et al. | .................... | 700/19 |
| 2006/0004939 A1 * | 1/2006 | Edwards et al. | .............. | 710/302 |
| 2006/0094360 A1 | 5/2006 | Jung et al. | | |

(Continued)

FOREIGN PATENT DOCUMENTS

| | | |
|---|---|---|
| CN | 1428034 | 7/2003 |
| CN | 1538688 | 10/2004 |
| CN | 101431456 | 5/2009 |

OTHER PUBLICATIONS

Rhee et al., UPnP Home Networking-Base IEEE 1394 Digital Home Appliances Control, 2004, DSP & Multimedia System Lab., p. 457-466.*

(Continued)

*Primary Examiner* — Kidest Bahta
(74) *Attorney, Agent, or Firm* — The Farrell Law Firm, P.C.

(57) ABSTRACT

A method and system for managing capabilities of a control device in a Universal Plug and Play (UPnP) home network. The method includes advertising a list of capabilities of a control device to a control point in the UPnP home network, updating, by the control device, a capability in the list of capabilities, and advertising an updated list of capabilities to the control point.

17 Claims, 7 Drawing Sheets

(56) References Cited

U.S. PATENT DOCUMENTS

| | | | |
|---|---|---|---|
| 2006/0259184 A1* | 11/2006 | Hayes et al. | 700/221 |
| 2007/0143489 A1* | 6/2007 | Pantalone | 709/230 |
| 2007/0148047 A1* | 6/2007 | Itsuji et al. | 422/82.11 |
| 2007/0233841 A1* | 10/2007 | Jin et al. | 709/223 |
| 2007/0259683 A1* | 11/2007 | Hartikainen et al. | 455/550.1 |
| 2008/0320177 A1* | 12/2008 | Jung et al. | 710/18 |
| 2009/0210555 A1 | 8/2009 | Han et al. | |
| 2011/0314192 A1* | 12/2011 | Ahn et al. | 710/63 |

OTHER PUBLICATIONS

Yiqui et al., Home Network and Control based on UPnP An Implementation, 2009, South China University of Technology, pp. 385-388.*

Tom Fout, Universal Plug and Play Client Support, Aug. 2001, Window network and Communication, pp. 1-10.*

Blokhuis et al., Universal Plug and Play Vulnerabilities in Eventing, University of Amsterdam, Feb. 4, 2009, p. 1-20.*

* cited by examiner

SYSTEM AND METHOD FOR MANAGING A CONTROL DEVICE IN A UNIVERSAL PLUG AND PLAY HOME NETWORK

PRIORITY

This application claims priority under 35 U.S.C. §119(a) to Indian Provisional Patent Application No. 2718/CHE/2010, which was filed in the Indian Patent Office on Sep. 16, 2010, the entire content of which is hereby incorporated by reference.

BACKGROUND OF THE INVENTION

1. Field of the Invention

The present invention relates generally to a Universal Plug and Play (UPnP) home network system, and more particularly, to managing a control device in a UPnP home network.

2. Description of the Related Art

UPnP is a set of computer network protocols promulgated by the UPnP forum. The goal of UPnP is to provide a set of networking protocols for primarily residential networks that permits networked devices, such as Personal Computers (PCs), printers, Internet gateways, Wi-Fi access points, mobile devices, etc., to seamlessly discover each other's presence on the network and establish functional network services for data sharing, communications, and entertainment.

Accordingly, UPnP technology caters to a wide range of devices in a home network. UPnP provides discovery, control, and eventing mechanisms. Discovery is enabled using a Simple Service Discovery Protocol (SSDP), and eventing follows a General Event Notification Architecture (GENA) protocol. Using these technologies, UPnP makes availability and unavailability of the UPnP devices known to the other devices in the UPnP home network.

UPnP architecture allows peer-to-peer networking of PCs, networked appliances, and wireless devices. It is distributed, open architecture based on established standards such as Transport Control Protocol/Internet Protocol (TCP/IP), User Datagram Protocol (UDP), HyperText Transfer Protocol (HTTP) and eXtended Mark-up Language (XML). The UPnP architecture also supports zero configuration networking. For example, a UPnP compatible device from any vendor can dynamically join a network, obtain an IP address, announce its name, convey its capabilities upon request, and learn about the presence and capabilities of other devices in the network. However, the UPnP devices can also automatically leave the UPnP home network without leaving any unwanted state information.

The foundation for UPnP networking is IP addressing. Basically, each UPnP device (e.g., a control device or a control point) includes a Dynamic Host Configuration Protocol (DHCP) client that searches for a DHCP server when the UPnP device is first connected to the UPnP home network. If no DHCP server is available, the UPnP device assigns itself an address. If during the DHCP transaction, the UPnP device obtains a domain name, for example, through a Domain Name System (DNS) server or via DNS forwarding, the UPnP device uses that name in subsequent network operations; otherwise, the UPnP device uses its IP address.

Typically, control devices in a UPnP home network expose their functionality using device and service descriptions stored in a device and service description document. The device and service description document includes actions and state variables that a control point is capable of invoking or collecting information about.

Generally, when a control device joins a UPnP home network, the control device advertises capabilities of the control device as listed in a device and service description document. Based on the advertised capabilities, a control point may select a control device for availing an UPnP service. For example, the control point may select a printer for printing a document based on the advertisement message. In this case, 'print' is a capability of the printer that is listed in the service description sent as an advertisement message.

However, some capabilities may start malfunctioning or may no longer be available after advertising a list of the capabilities. In such a case, the control point may still initiate requests associated with the malfunctioning capabilities, based on the advertised capabilities, as the control point is not aware of the malfunctioning or no longer available capabilities. However, as the control device is unable to service these requests initiated by the control point, this may lead to a flooding of unserviceable requests at the control device and poor user experience at the control point.

SUMMARY OF THE INVENTION

Accordingly, the present invention has been made to solve at least the above-described problems occurring in the prior art, and to provide at least the following advantages.

An aspect of the present invention is provide a system and method for managing capabilities of a control device in a UPnP home network, wherein a malfunctioning or no loner available capability is disabled.

Another aspect of the present invention is provide a system and method for managing capabilities of a control device in a UPnP home network, which disable a malfunctioning capability and re-advertise an updated list of capabilities.

Another aspect of the present invention is provide a system and method for managing capabilities of a control device in a UPnP home network, which re-enable a disabled capability and re-advertise an updated list of capabilities.

Another aspect of the present invention is provide a system and method for managing capabilities of a control device in a UPnP home network, which add a new capability to a list of capabilities and re-advertise an updated list of capabilities.

In accordance with an aspect of the present invention, a method of managing capabilities of a control device in a Universal Plug and Play (UPnP) home network is provided. The method includes advertising a list of capabilities of a control device to a control point in the UPnP home network; updating, by the control device, a capability in the list of capabilities; and advertising an updated list of capabilities to the control point.

In accordance with another aspect of the present invention, a control device apparatus of a Universal Plug and Play (UPnP) home network is provided. The apparatus includes a memory that stores a list of capabilities; and a processor for advertising a list of capabilities to a control point in the UPnP home network, updating a capability in the list of capabilities, and advertising an updated list of capabilities to the control point.

In accordance with another aspect of the present invention, a Universal Plug and Play (UPnP) home network system is provided. The system includes a control point; and a control device in communication with the control points via the UPnP home network. The control device advertises a list of capabilities to the control point, updates a capability in the list of capabilities, and advertises an updated list of capabilities to the control point.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following detailed description, same elements will be designated by same reference numerals although they are shown in different drawings. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims. Further, in the following description of the present invention, a detailed description of known functions and configurations incorporated herein will be omitted to avoid obscuring the subject matter of the present invention.

Figure 1:
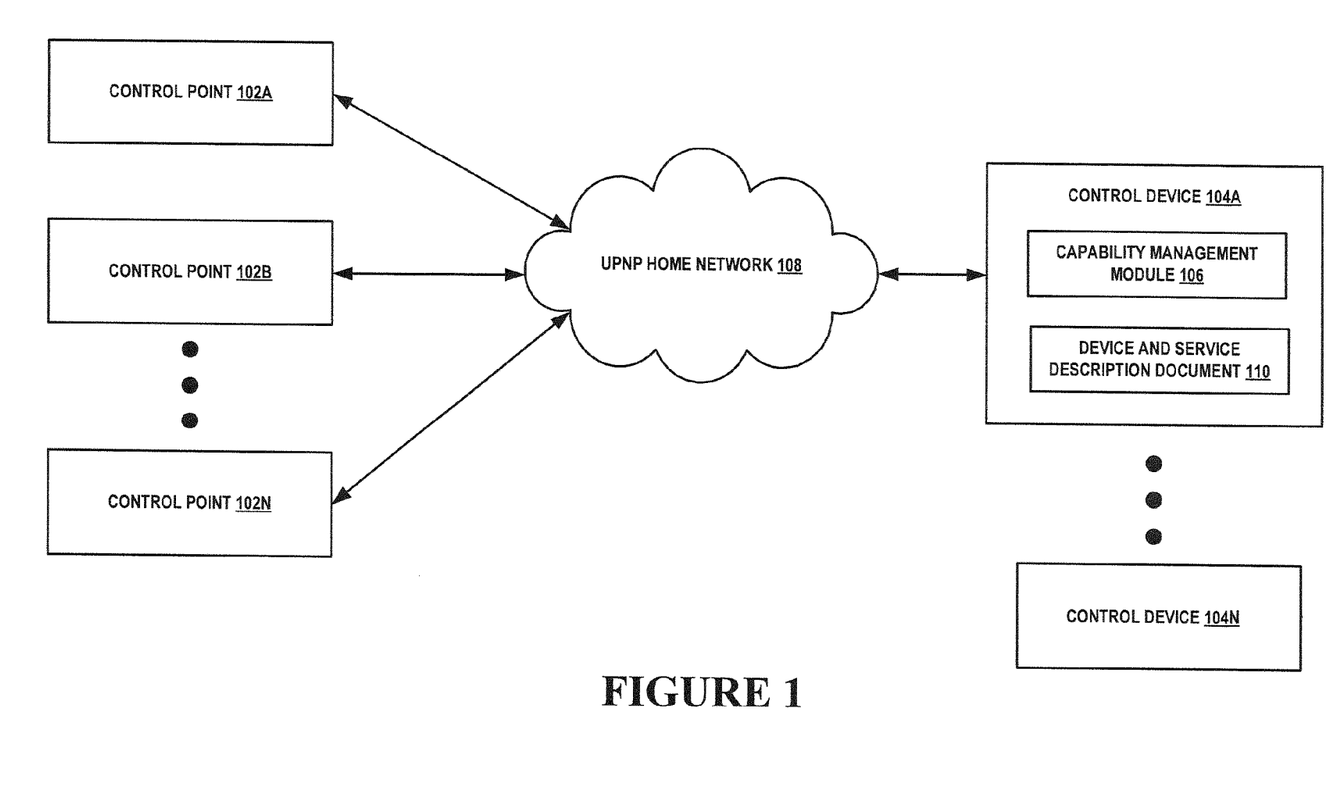
FIG. 1 is a block diagram illustrating a UPnP home network system for managing capabilities of a control device, according to an embodiment of the present invention.

FIG. 1 is a block diagram illustrating a UPnP home network system for managing capabilities of a control device, according to an embodiment of the present invention.

Referring to FIG. 1, the UPnP home network system includes control points 102A-N, control devices 104A-N connected via a UPnP home network 108. Each of the control devices 104A-N includes a capability management module 106 and a device and service description document 110 stored in a memory thereof. The capability management module 106 is a code (or program) operated by a processor for managing the capabilities supported by the control device. For example, the control point 102A is a master control point that controls operation of the control device 104A, and the control point 102B establishes a connection with the control device 104A via the UPnP home network 108.

Figure 2:
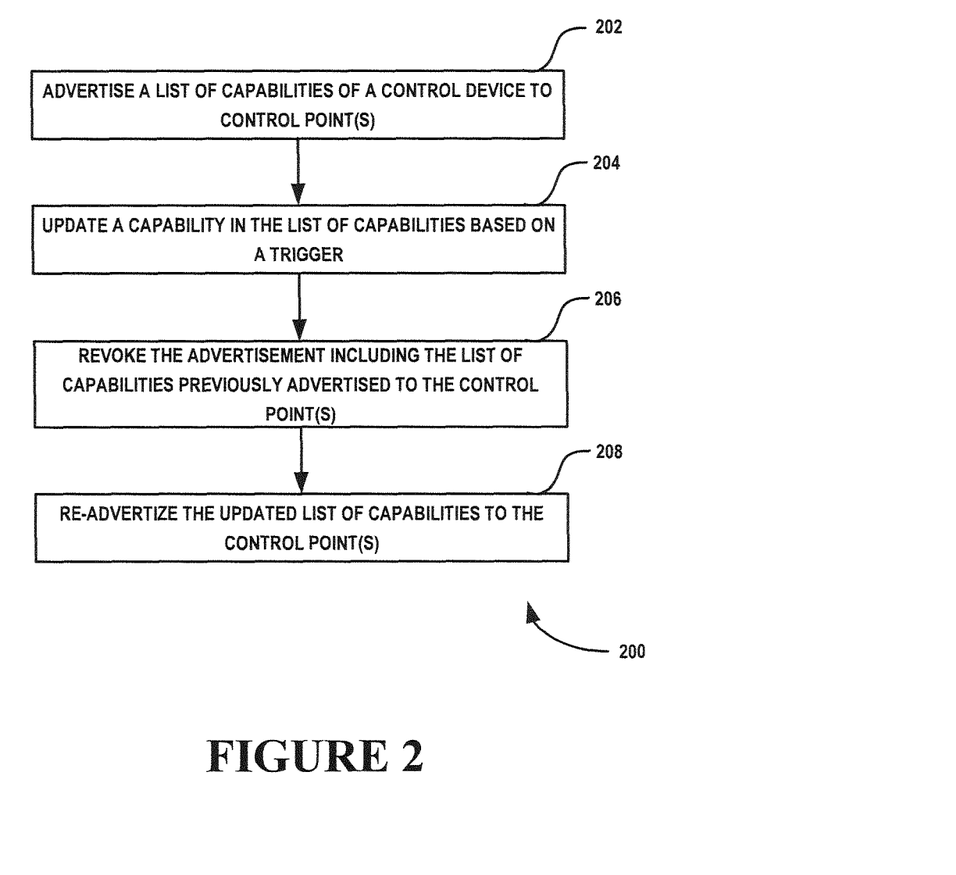
FIG. 2 is a flowchart illustrating a method of managing capabilities of a control device, according to an embodiment of the present invention.

FIG. 2 is a flowchart illustrating a method of managing capabilities of a control device, according to an embodiment of the present invention.

Referring to FIG. 2, the capability management module 106 advertises a list of capabilities supported by the control device 104A to the control point 102A and 102B upon connecting with the control points 102A-B in step 202. The list of capabilities may include a UPnP feature (e.g., call management service), a UPnP service (e.g., a messaging service), and/or a UPnP functionality (e.g., Print functionality). The list of the capabilities is advertised to the control points 102A-B in order to enable the control points 102A-B to send an appropriate service request to the control device 104A based on the advertised list of capabilities.

In step 204, the capability management module 106 updates the list of capabilities stored in a memory (not shown), when a trigger is invoked. The list of capabilities is maintained in a device and service description document 110 stored in the memory of the control device 104A. For example, the list of capabilities may be maintained in the device and service description document 110 in an XML format, or in a data model format.

The master control point 102A may initiate a health test on the control device 104A. During the health test, the master control point 102A may find that a particular UPnP functionality is malfunctioning. Therefore, the master control point 102A notifies the control device 104A that the particular UPnP functionality is malfunctioning and instructs the control device 104A to disable the particular UPnP functionality. Accordingly, the capability management module 106 disables the malfunctioning capability and updates the device and service description document 110, indicating that the capability is disabled, as will be described in more detail below with reference to FIG. 3A. For example, the instructions to disable the capability act as a trigger for the control device 104A. Additionally, the capability management module 106 may disable the capability if the capability is optional or may return an error indicating that the capability is mandatory, as will be described in more detail below with reference FIG. 3B.

In step 206, the capability management module 106 revokes the advertisement indicating the list of capabilities previously advertised to the control points 102A and 102B. Accordingly, in step 208, the capability management module 106 re-advertises the updated list of capabilities to the control points 102A and 102B, such that the control points 102A and 102B are made aware of the disabled capability through the re-advertisement. This re-advertisement will assist the control point 102B to avoid invoking a functionality associated with the malfunctioning capability. Based on the foregoing, one or more capabilities can be disabled/re-enabled either partially or entirely based on the instructions of the master control point 102A.

Figure 3A:
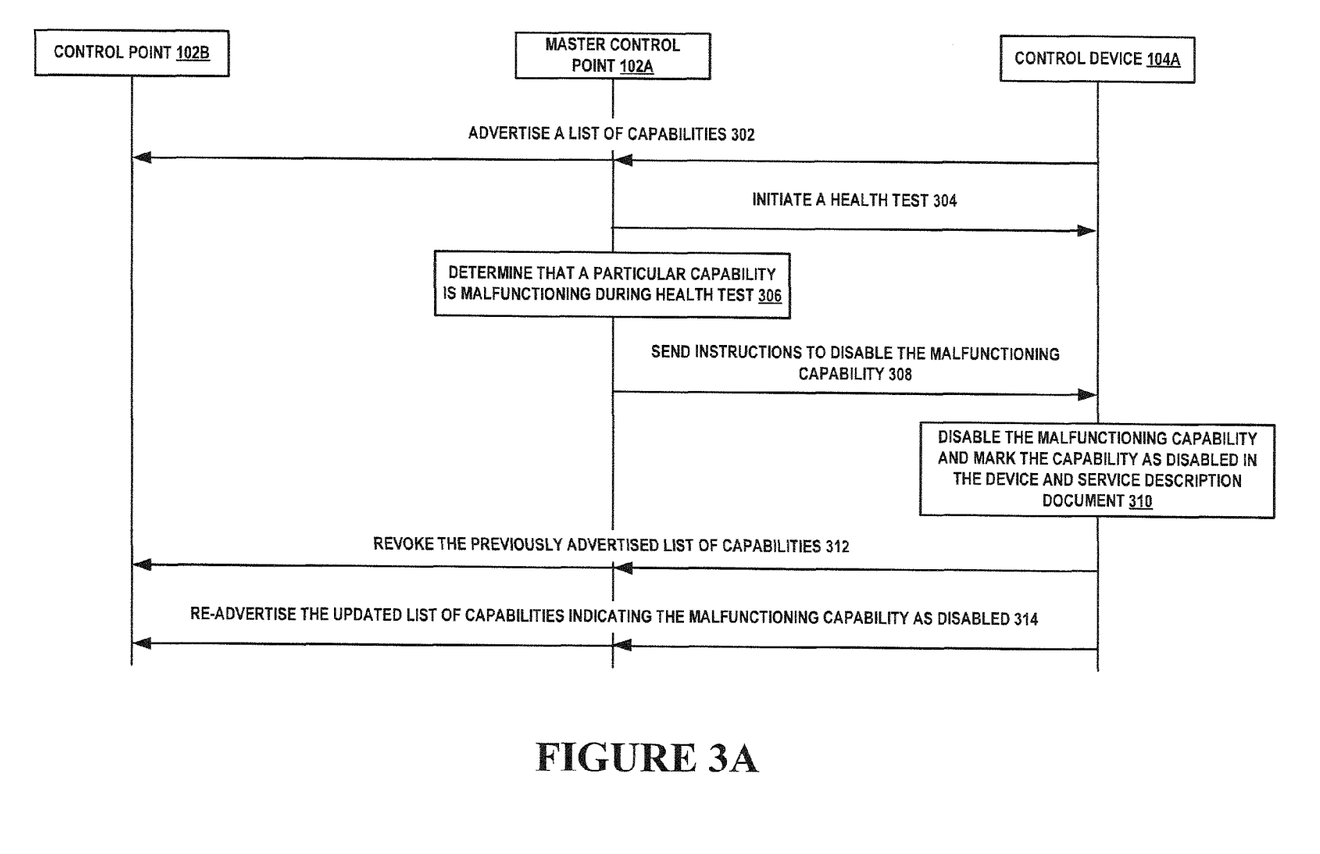
FIG. 3A is a signal flow diagram illustrating a method of disabling a malfunctioning capability and re-advertising an updated list of capabilities, according to an embodiment of the present invention.

FIG. 3A is a signal flow diagram illustrating a method of disabling a malfunctioning capability and re-advertising the updated list of capabilities, according to an embodiment of the present invention.

Referring to FIG. 3A, in step 302, the control device 104A advertises a list of capabilities to the control point 102B, upon joining the UPnP home network. In step 304, the master control point 102A initiates a health test at the control device 104A. In step 306, while the health test is running at the control device 104A, the master control point 102A determines that a capability (e.g., a call handling, session handling, call management, etc.) of the control device 104A is malfunctioning.

In step 308, the master control point 102A notifies the control device 104A that the capability is not functioning correctly, and instructs the control device 104A to disable the malfunctioning capability. Accordingly, in step 310, the control device 104A disables the malfunctioning capability and marks the capability in the device and service description document 110 as disabled.

In step 312, the control device 104A revokes the advertisement indicating the list of capabilities previously advertised to the control points 102A and 102B. In step 314, upon successful revocation, the control device 104A re-advertises the updated list of capabilities to the control points 102A and 102B, indicating that the malfunctioning capability is disabled. Accordingly, the control point 102B may avoid invoking functionality associated with the disabled capability based on the re-advertised list of capabilities. Additionally, using the above-describe method, the master control point 102A may instruct the control device 104A to disable a capability when desired (e.g., even when the UPnP functionality is functioning correctly). In such a case, the master control point 102A does not perform steps 304 and 306, but sends instructions to disable the capability to the control device 104A when desired, in step 308.

Figure 3B:
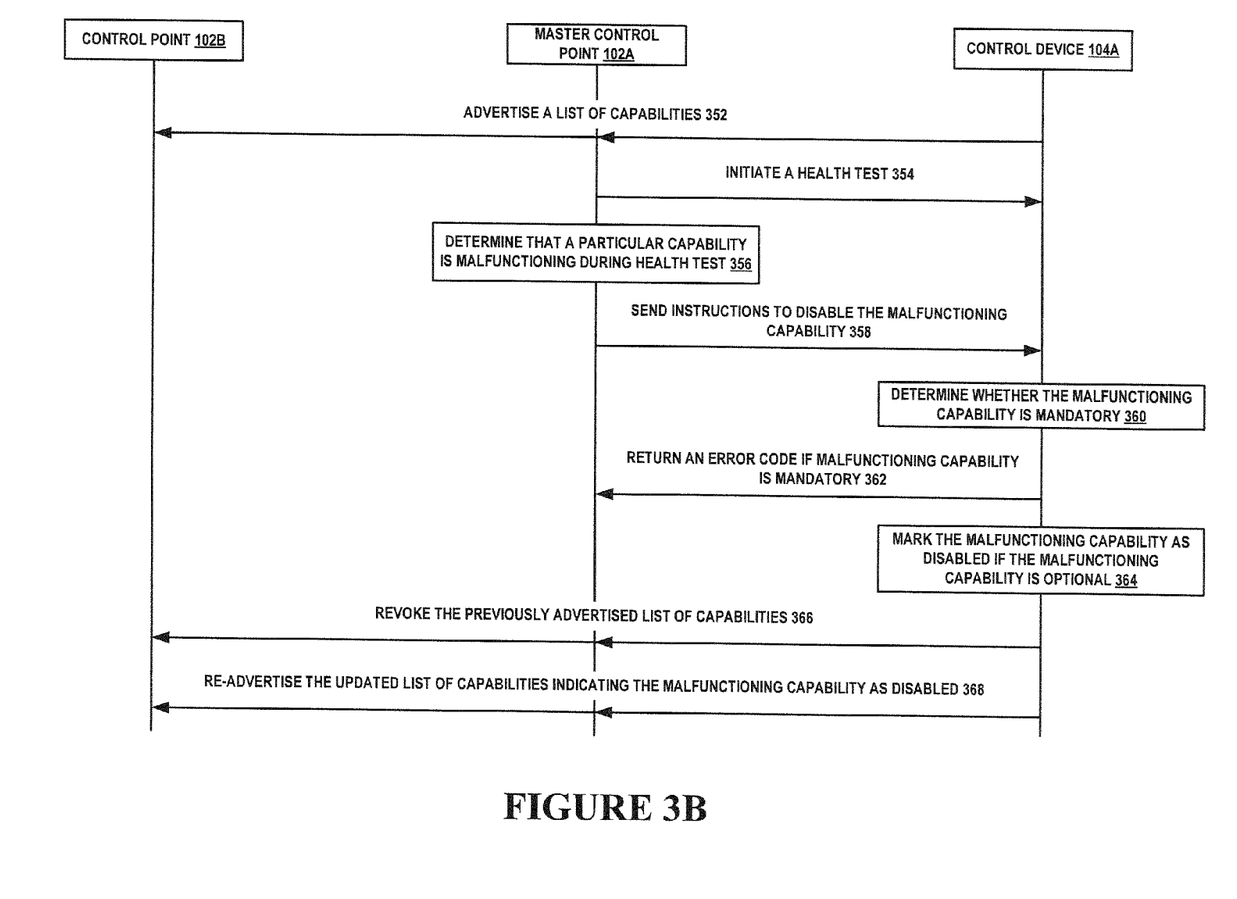
FIG. 3B is a signal flow diagram illustrating a method of disabling a malfunctioning capability based on a capability type, according to an embodiment of the present invention.

FIG. 3B is a signal flow diagram illustrating a method of disabling a malfunctioning capability based on a capability type, according to an embodiment of the present invention.

Referring to FIG. 3B, in step 352, the control device 104A advertises a list of capabilities to the control point 102B, upon joining the UPnP home network. In step 354, the master control point 102A initiates a health test at the control device 104A. In step 356, while the health test is running at the control device 104A, the master control point 102A determines that a capability (e.g., a call handling, session handling, call management, etc.) of the control device 104A is malfunctioning.

In step 358, the master control point 102A notifies the control device 104A that the capability is not functioning correctly and instructs the control device 104A to disable the malfunctioning capability. Accordingly, in step 360, the control device 104A determines whether the malfunctioning capability is a mandatory capability. For example, the control device 104A may include mandatory capabilities and optional capabilities. The mandatory capabilities include capabilities, which cannot be modified or removed, whereas the optional capabilities can be added, modified, or removed. If the malfunctioning capability is mandatory, then in step 362, the control device 104A returns an error message to the master control point 102A.

However, if the malfunctioning capability is optional, then in step 364, the control device 104A disables the malfunctioning capability and marks the capability as disabled in the device and service description document 110. In step 366, the control device 104A revokes the advertisement indicating the list of capabilities previously advertised to the control points 102A and 102B. In step 368, upon successful revocation, the control device 104A re-advertises the updated list of capabilities to the control points 102A and 102B, indicating the malfunctioning capability as disabled. Accordingly, the control point 102B may avoid invoking functionality associated with the disabled capability, based on the re-advertised list of capabilities.

Figure 4:
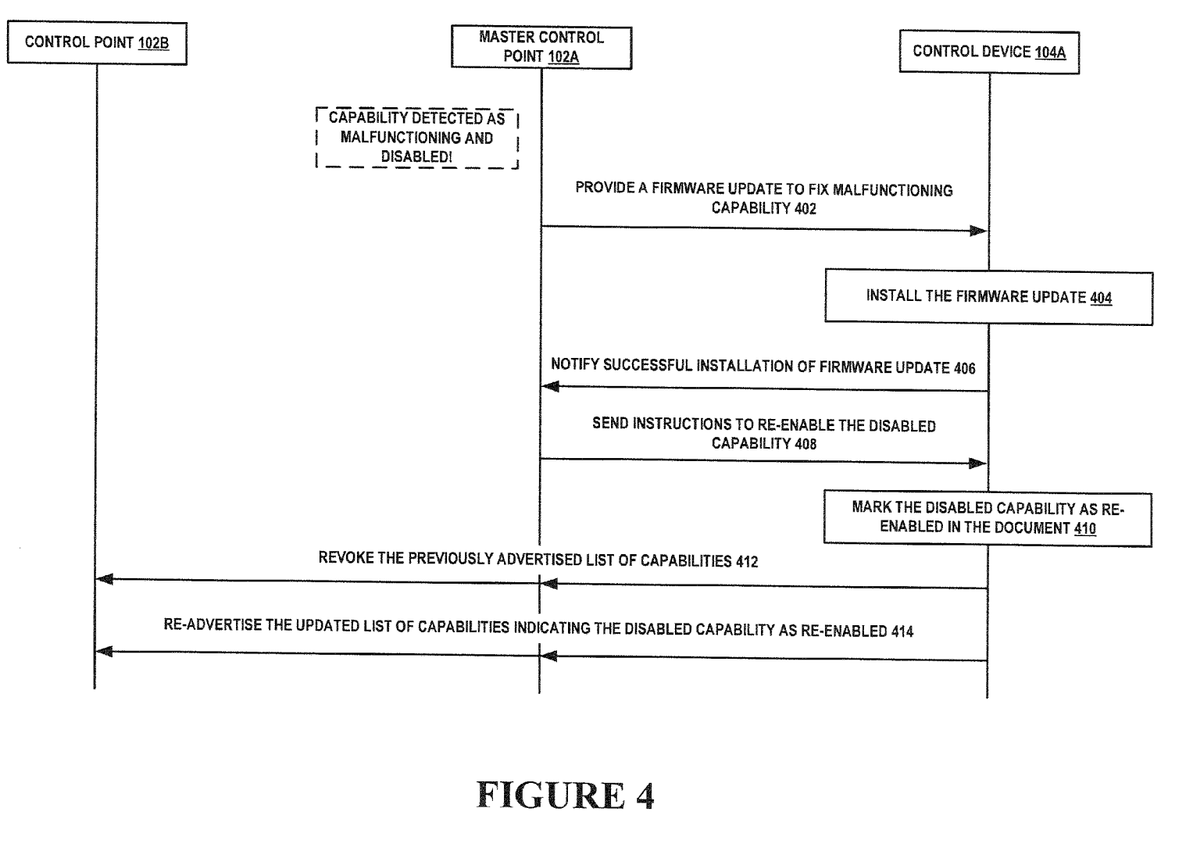
FIG. 4 is a signal flow diagram illustrating a method of re-enabling a disabled capability and re-advertising an updated list of capabilities, according to an embodiment of the present invention.

FIG. 4 is a signal flow diagram illustrating a method of re-enabling the disabled capability and re-advertising the updated list of capabilities, according to an embodiment of the present invention.

Referring to FIG. 4, when a particular capability is malfunctioning, the control device 104A marks the malfunctioning capability as disabled in the list of capabilities and re-advertises the updated list of capabilities to the control points 102A and 102B, as described above in relation to FIGS. 3A and 3B. However, the malfunctioning capability may be fixed or repaired through a firmware update operation. For example, the master control point 102A provides a firmware update to fix the malfunctioning capability, in step 402. In step 404, the control device 104A installs the firmware update received from the master control point 102A. Consequently, the capability malfunctioning issue is fixed through the firmware updating operation.

Accordingly, in step 406, the control device 104A notifies successful installation of the firmware update to the master control point 102A. In step 408, the master control point 102A sends instructions the control device 104A to re-enable the disabled capability, and in step 410, the control device 104A marks the capability as re-enabled in the device and service description document 110, based on the instructions from the master control point 102A.

In step 412, the control device 104A revokes the advertisement indicating the list of capabilities previously advertised to the control points 102A and 102B. In step 414, upon successful revocation, the control device 104A re-advertises the updated list of capabilities to the control points 102A and 102B, indicating the disabled capability as re-enabled. Therefore, the control point 102B can now invoke functionality associated with the re-enabled capability, based on the re-advertised list of capabilities.

Figure 5:
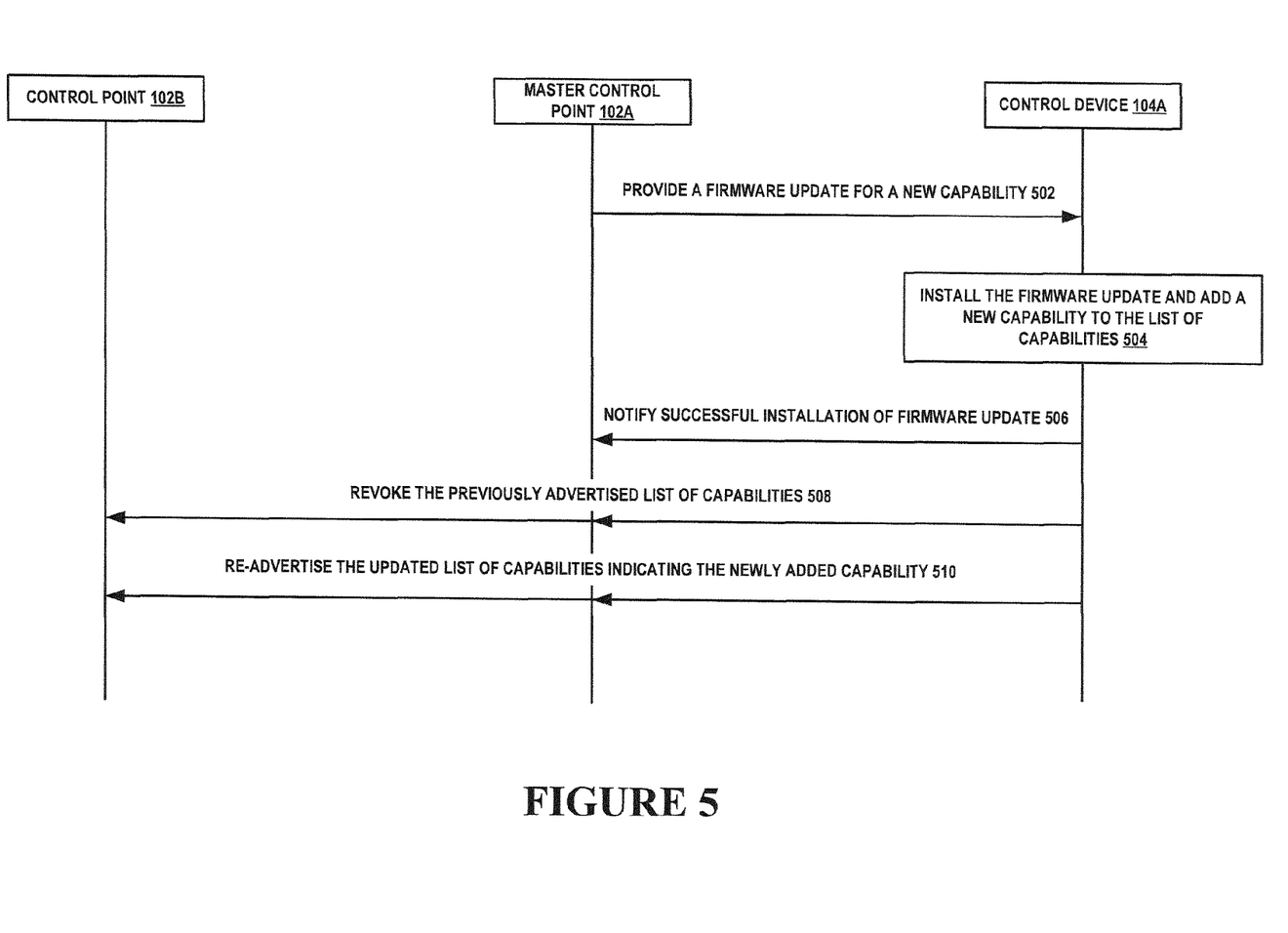
FIG. 5 is a signal flow diagram illustrating a method of adding a new capability to a list of capabilities and re-advertising an updated list of capabilities, according to an embodiment of the present invention.

FIG. 5 is a signal flow diagram illustrating a method of adding a new capability to the list of capabilities and re-advertising the updated list of capabilities, according to an embodiment of the present invention.

Referring to FIG. 5, in step 502, when a new capability is to be added, the master control point 102A provides a firmware update for a new capability to the control device 104A. In step 504, the control device 104A installs the firmware update, and upon successful installation of the firmware update, adds the new capability to the device and service description document 110.

In step 506, the control device 104A notifies the successful installation of the firmware update to the master control point 102A. In step 508, the control device 104A revokes the advertisement indicating the list of capabilities previously advertised to the control points 102A and 102B. In step 510, upon successful revocation, the control device 104A re-advertises the updated list of capabilities to the control points 102A and 102B, indicating the newly added capability. Accordingly, the control point 102B can now invoke functionality associated with the newly added capability, based on the re-advertised list of capabilities.

Figure 6:
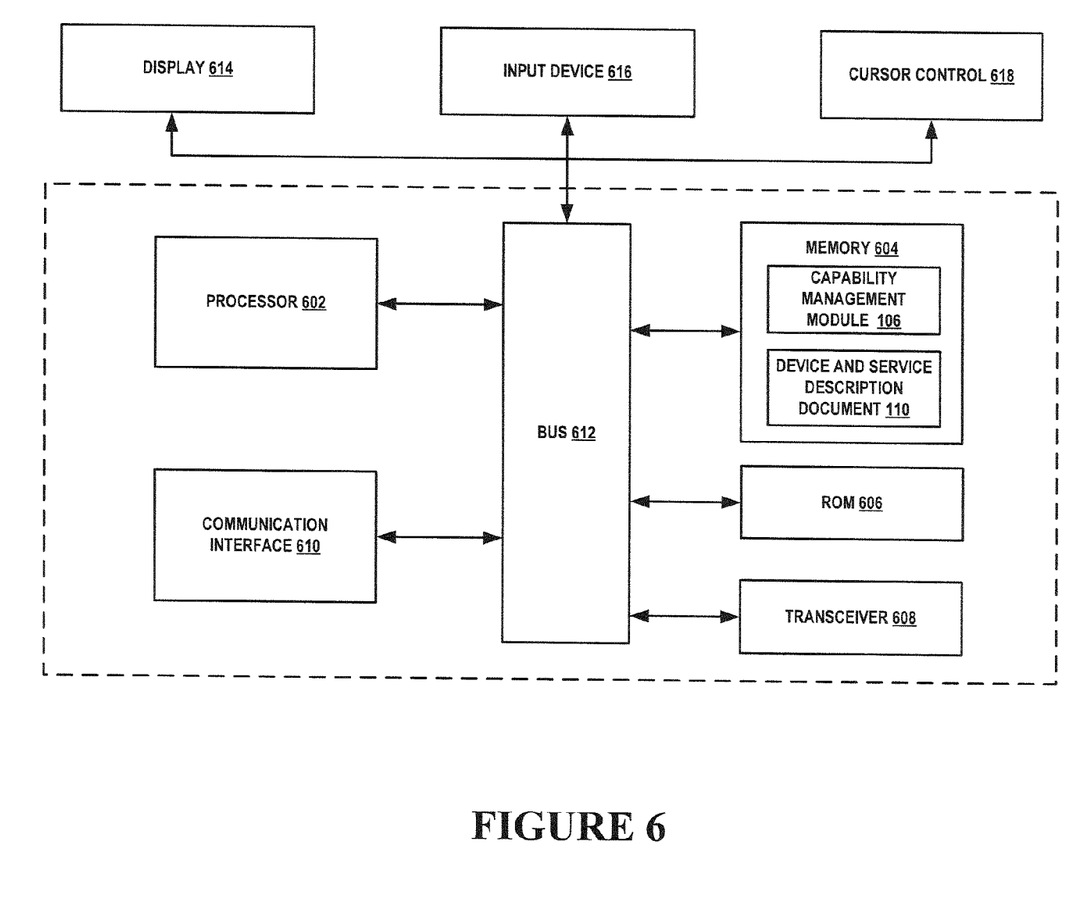
FIG. 6 is a block diagram illustrating components of a control device of a UPnP home network system, according to an embodiment of the present invention.

FIG. 6 is a block diagram illustrating components of a control device of a UPnP home network system according to an embodiment of the present invention.

Referring to FIG. 6, the control device includes a processor 602, a memory 604, a Read Only Memory (ROM) 606, a transceiver 608, a communication interface 610, a bus 612, a display 614, an input device 616, and a cursor control 618.

The processor 602, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, etc. The processor 602 may also include embedded controllers, such as generic or programmable logic devices or arrays, application specific integrated circuits, single-chip computers, smart cards, etc.

The memory 604 and the ROM 606 may be volatile memory and non-volatile memory. The memory 604 includes the capability management module 106 for managing capabilities associated with the control device, and a device and service description document 110 including the list of capabilities. A variety of computer-readable storage media may be stored in and accessed from the memory elements. Memory elements may include any suitable memory device for storing data and machine-readable instructions, such as a ROM, a Random Access Memory (RAM), Erasable Programmable ROM (EPROM), Electrically EPROM (EEPROM), a hard drive, a removable media drive for handling compact disks, digital video disks, diskettes, magnetic tape cartridges, memory cards, Memory Sticks™, etc.

Various embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 602. For example, a computer program may include machine-readable instructions capable of managing capabilities of the control device. For example, the program may be included on a Compact Disk-ROM (CD-ROM) and loaded from the CD-ROM to a hard drive in the non-volatile memory. The machine-readable instructions may cause the control device to encode according to the various embodiments of the present invention.

The transceiver 608 advertises/re-advertises a list of capabilities and receives instructions/firmware updates from a master control point. The bus 612 acts as interconnect between various components of the control device. The components, such as the communication interface 610, the display 614, the input device 616, and the cursor control 618 are well known to the person skilled in the art, and therefore, a detailed explanation thereof is omitted.

The various devices, modules, analyzers, generators, etc., as described above, may be enabled and operated using hardware circuitry, e.g., complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the present invention has been described above with reference to certain embodiments thereof, it will be evident that various modifications and changes may be made to these embodiments without departing from the broader spirit and scope of the present invention, as defined by the appended claims and their equivalents.

What is claimed is:

1. A method of managing capabilities of a control device in a network, the method comprising:
 advertising, by the control device, a list of capabilities of the control device to a control point in the network;
 updating, by the control device, a capability in the list of capabilities; and
 advertising, by the control device, an updated list of capabilities to the control point,
 wherein updating the capability in the list of capabilities comprises:
 marking the capability as disabled in the list of capabilities, based on a malfunction trigger associated with the capability.

2. The method of claim 1, wherein marking the capability as disabled in the list of capabilities comprises:
 receiving instructions from the control point to disable a malfunctioning capability; and
 marking the capability as disabled in the list of capabilities, based on the instructions.

3. The method of claim 1, wherein updating the capability in the list of capabilities comprises:
 receiving instructions from the control point to disable a malfunctioning capability;
 determining whether the malfunctioning capability is a mandatory capability;
 if the malfunctioning capability is the mandatory capability, returning an error message to the control point; and
 if the malfunctioning capability is not the mandatory capability, marking the capability as disabled in the list of capabilities.

4. The method of claim 1, wherein updating the capability in the list of capabilities comprises:
 marking a disabled capability as re-enabled in the list of capabilities, when malfunctioning of the disabled capability is fixed.

5. The method of claim 1, wherein updating the capability in the list of capabilities comprises:
 adding the capability to the list of capabilities, based on a firmware update operation associated with the capability.

6. The method of claim 1, wherein advertising the updated list of capabilities to the control point comprises:
 revoking a previously advertised list of capabilities; and
 sending an advertisement message including the updated list of capabilities to the control points.

7. A control device apparatus of a network, the apparatus comprising:
 a memory that stores a list of capabilities; and
 a processor for advertising a list of capabilities to a control point in the network, updating a capability in the list of capabilities, and advertising an updated list of capabilities to the control point,
 wherein when updating the capability in the list of capabilities, the processor marks the capability as disabled in the list of capabilities, based on a malfunction trigger associated with the capability.

8. The apparatus of claim 7, wherein the malfunction trigger comprises instructions to disable the capability from the control point.

9. The apparatus of claim 7, wherein when updating the capability in the list of capabilities, the processor marks a disabled capability as re-enabled in the list of capabilities, when a malfunctioning capability is fixed.

10. The apparatus of claim 7, wherein when updating the capability in the list of capabilities, the processor adds a new capability to the list of capabilities, based on a firmware update operation associated with the new capability.

11. The apparatus of claim 7, wherein when updating the capability in the list of capabilities, the processor receives instructions from the control point to disable a malfunctioning capability, determines whether the malfunctioning capability is a mandatory capability, if the malfunctioning capability is the mandatory capability, returns an error message to the control point, and if the malfunctioning capability is not the mandatory capability, marks the capability as disabled in the list of capabilities.

12. The apparatus of claim 7, wherein when advertising the updated list of capabilities to the control points, the processor revokes a previously advertised list of capabilities, and sends an advertisement message including the updated list of capabilities to the control point.

13. A network system comprising:
a control point; and
a control device in communication with the control point via the network,
wherein the control device advertises a list of capabilities to the control point, updates a capability in the list of capabilities, and advertises an updated list of capabilities to the control point, and
wherein the control point sends instructions to the control device to disable a UPnP functionality, when the UPnP functionality is malfunctioning.

14. The system of claim a 13, wherein the control device marks the capability corresponding to the UPnP functionality as disabled in the list of capabilities, based on the instructions.

15. The system of claim 14, wherein the control device marks the capability marked as disabled, as re-enabled, in the list of capabilities, when the UPnP functionality is fixed.

16. The system of claim 13, wherein the control device updates the capability in the list of capabilities by adding the capability to the list of capabilities, based on a firmware update operation associated with the capability.

17. The system of claim 13, wherein the control device advertises the updated list of capabilities to the control point by revoking a previously advertised list of capabilities, and sending an advertisement message including the updated list of capabilities to the point.

* * * * *